(12) United States Patent
Shibayama et al.

(10) Patent No.: US 10,178,089 B2
(45) Date of Patent: Jan. 8, 2019

(54) MOBILE TERMINAL APPARATUS AND CONTROL METHOD

(71) Applicant: FUJITSU LIMITED, Kawasaki-shi, Kanagawa (JP)

(72) Inventors: Yukari Shibayama, Yokohama (JP); Hideyuki Motoyama, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 242 days.

(21) Appl. No.: 15/238,353

(22) Filed: Aug. 16, 2016

(65) Prior Publication Data

US 2017/0078266 A1    Mar. 16, 2017

(30) Foreign Application Priority Data

Sep. 10, 2015 (JP) ................................ 2015-178861

(51) Int. Cl.

| H04L 12/58 | (2006.01) |
|---|---|
| H04L 29/06 | (2006.01) |
| H04W 12/02 | (2009.01) |
| H04W 12/06 | (2009.01) |
| H04W 88/02 | (2009.01) |

(52) U.S. Cl.
CPC ............ *H04L 63/083* (2013.01); *H04L 51/16* (2013.01); *H04L 51/18* (2013.01); *H04L 63/0428* (2013.01); *H04W 12/02* (2013.01); *H04W 12/06* (2013.01); *H04L 51/00* (2013.01); *H04L 51/08* (2013.01); *H04W 88/02* (2013.01)

(58) Field of Classification Search
CPC . H04L 63/04; H04L 63/0407; H04L 63/0428; H04L 63/08; H04L 63/083; H04L 51/00; H04L 51/08; H04L 51/10; H04L 51/18; H04W 12/02; H04W 12/06

See application file for complete search history.

(56) References Cited

U.S. PATENT DOCUMENTS 6,223,213 B1 * 4/2001 Cleron ................. G06Q 10/107
709/206
8,615,657 B2 * 12/2013 Yoshizawa ................ H04L 9/30
713/168

(Continued)

FOREIGN PATENT DOCUMENTS

| EP | 2 421 210 A1 | 2/2012 |
| JP | 2013-239903 A | 11/2013 |

OTHER PUBLICATIONS

European Search Report dated Nov. 10, 2016, issued in counterpart European Patent Application No. 16184292.7. (7 pages).

*Primary Examiner* — Eric W Shepperd
(74) *Attorney, Agent, or Firm* — Westerman, Hattori, Daniels & Adrian, LLP

(57) ABSTRACT

Disclosed is a mobile terminal apparatus including one or more processors configured to execute a process. The process includes storing content data acquired in a specific mode in a storage, acquiring an address corresponding to authentication information at authentication when the content data are acquired in the specific mode, generating a first mail to which the content data are attached and setting the address in the first mail as a transmission destination, transmitting the generated first mail to the address, and controlling deleting the stored content data and a transmission history of the transmitted first mail.

17 Claims, 14 Drawing Sheets

(56) References Cited

U.S. PATENT DOCUMENTS

| | | | | |
|---|---|---|---|---|
| 8,776,017 | B2* | 7/2014 | Perlmutter | G06F 21/6218 |
| | | | | 717/115 |
| 8,910,304 | B2* | 12/2014 | Tsujimoto | G06F 21/6245 |
| | | | | 713/161 |
| 9,246,927 | B2* | 1/2016 | Nelson | H04L 63/12 |
| 9,754,217 | B2* | 9/2017 | LeVasseur | G06N 99/005 |
| 2002/0042815 | A1* | 4/2002 | Salzfass | H04L 12/5855 |
| | | | | 709/206 |
| 2004/0260710 | A1* | 12/2004 | Marston | G06Q 10/107 |
| 2006/0044589 | A1* | 3/2006 | Nakagawaji | G06F 21/608 |
| | | | | 358/1.14 |
| 2007/0071199 | A1 | 3/2007 | Ozeki | |
| 2008/0235344 | A1* | 9/2008 | Paul | G06Q 10/107 |
| | | | | 709/206 |
| 2009/0163177 | A1* | 6/2009 | Bearden | H04L 51/066 |
| | | | | 455/412.1 |
| 2011/0164279 | A1* | 7/2011 | Wang | H04N 1/00244 |
| | | | | 358/1.15 |
| 2012/0129501 | A1* | 5/2012 | Silva | H04L 12/1831 |
| | | | | 455/412.1 |
| 2014/0059356 | A1* | 2/2014 | Nesnow | G06F 21/602 |
| | | | | 713/189 |

* cited by examiner

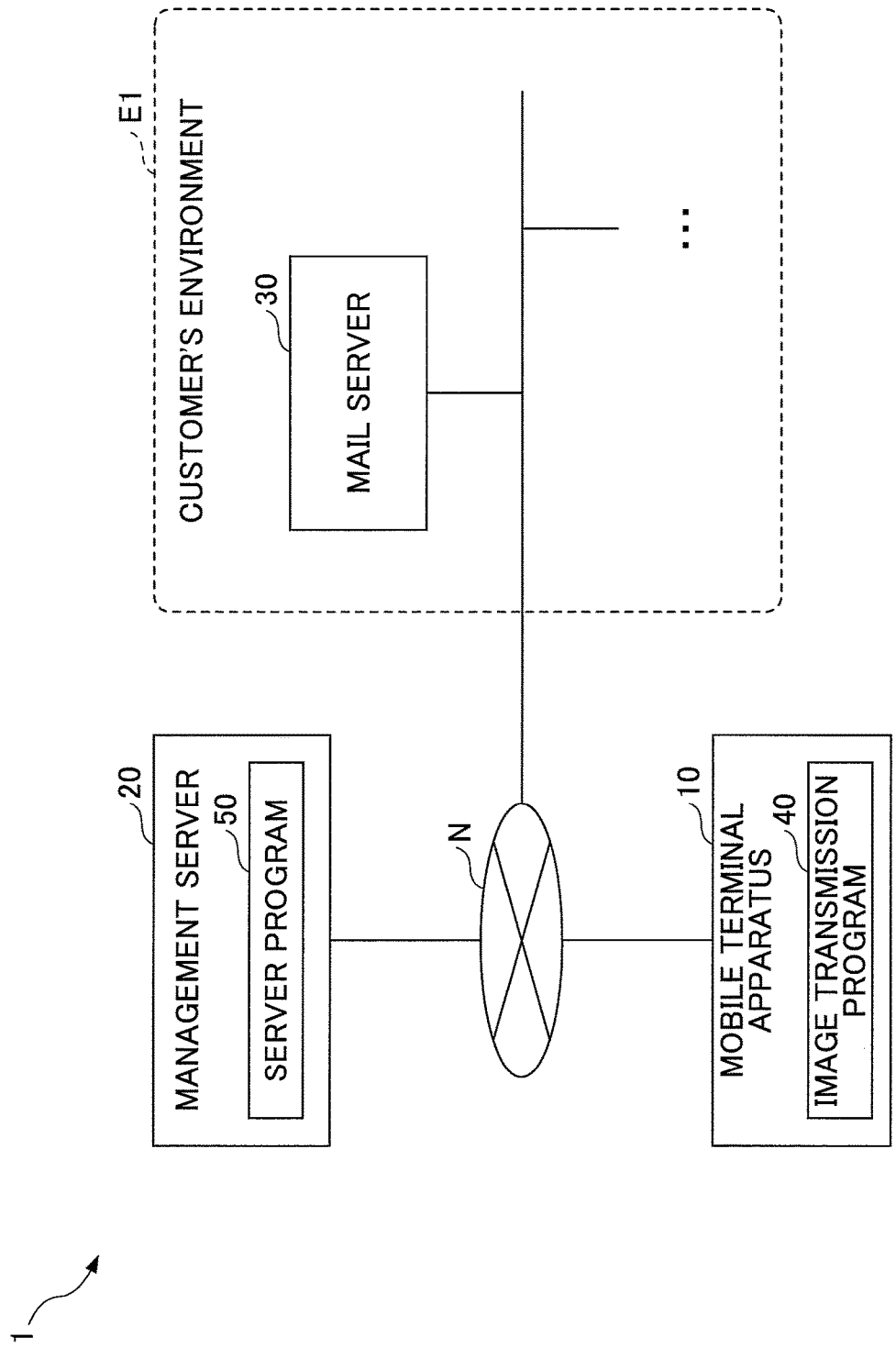

FIG.4

| LOGIN ID | LOGIN PASSWORD | MAIL ACCOUNT | MAIL PASSWORD |
|---|---|---|---|
| user001 | ******** | tanaka | ******** |
| user002 | ******** | suzuki | ******** |
| user003 | ******** | yamada | ******** |

204

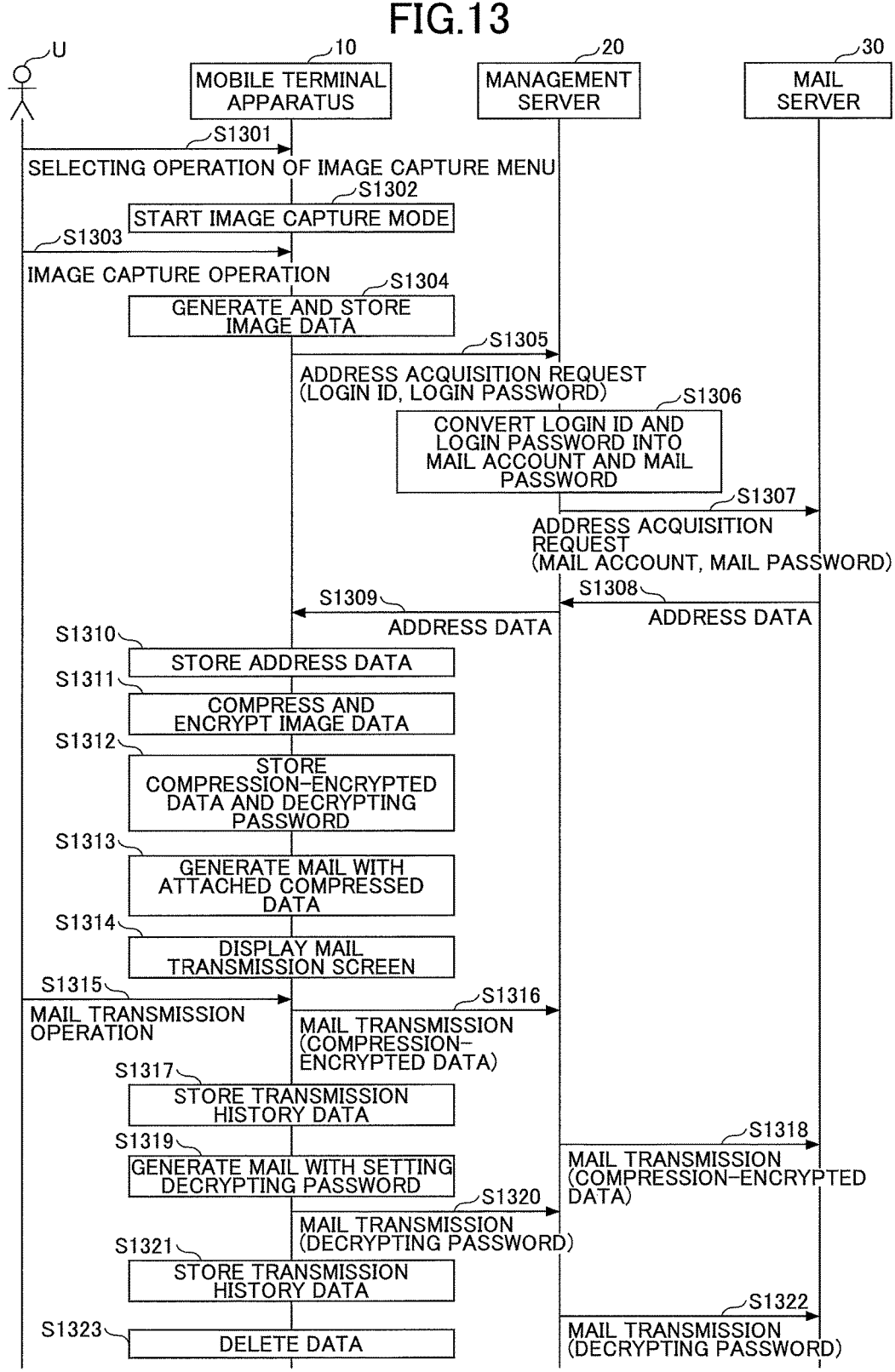

MOBILE TERMINAL APPARATUS AND CONTROL METHOD

CROSS-REFERENCE TO RELATED APPLICATIONS

This application is based upon and claims the benefit of priority of the prior Japanese Patent Application No. 2015-178861, filed on Sep. 10, 2015, the entire contents of which are incorporated herein by reference.

FIELD

The disclosures discussed herein relate to a mobile terminal apparatus, and a control method.

BACKGROUND

There has been a growing number of companies that introduce smart devices such as smartphones or tablet terminals into their daily business operations. In conferences or meetings, attendees of the conference frequently capture images of notes written on a white board using their smart devices to send the captured images to their own personal computers (PCs) via mails.

Such image data taken by the smart devices such as smartphones are vulnerable to leakage. There is disclosed a related-art technology capable of deleting image data after the transmission of the image data to their PCs in order to reduce such divulging of the image data (e.g., Patent Document 1).

However, the image data taken by the tablet terminals or the like may still be liable to leakage. For example, when a wrong mail address is set for transmitting the image data taken by a tablet terminal via mail, the image data will be transmitted to the wrong address.

RELATED-ART DOCUMENT

Patent Document

Patent Document 1: Japanese Laid-open Patent Publication No. 2013-239903

SUMMARY

According to an aspect of embodiments, there is provided a mobile terminal apparatus including one or more processors configured to execute a process. The process includes storing content data acquired in a specific mode in a storage; acquiring an address corresponding to authentication information at authentication when the content data are acquired in the specific mode; generating a first mail to which the content data are attached and setting the address in the first mail as a transmission destination; transmitting the generated first mail to the address; and controlling deleting the stored content data and a transmission history of the transmitted first mail.

The object and advantages of the invention will be realized and attained by means of the elements and combinations particularly pointed out in the appended claims.

It is to be understood that both the foregoing general description and the following detailed description are exemplary and explanatory and are not restrictive of the invention, as claimed.

BRIEF DESCRIPTION OF THE DRAWINGS

FIG. 1 is a diagram illustrating an example of an overall configuration of an image transmission system according to a first embodiment;

FIG. 4 is a table illustrating an example of a user information DB;

FIG. 13 is a sequence diagram illustrating an example of an image transmission process according to the second embodiment.

DESCRIPTION OF EMBODIMENTS

Figure 2A:
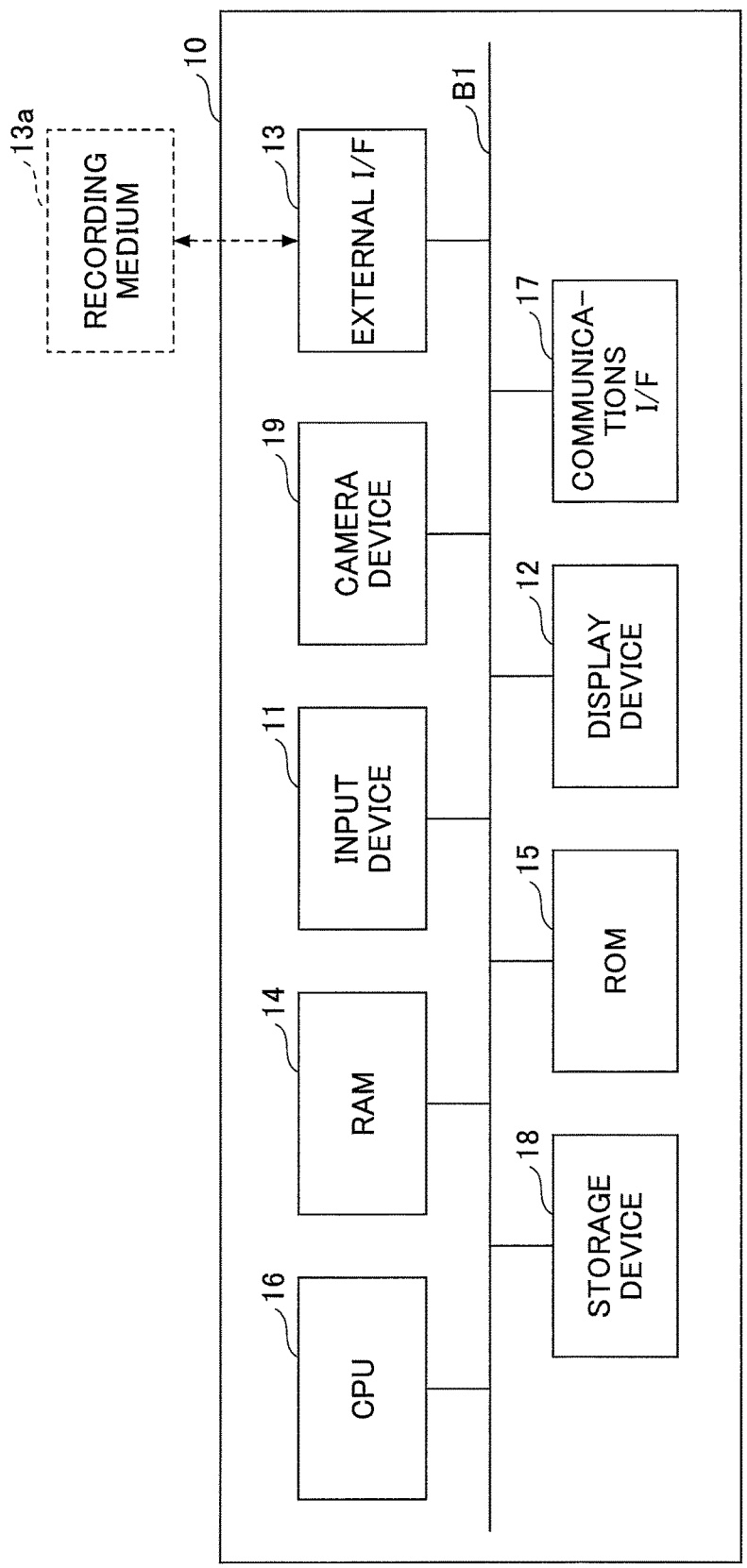
FIGS. 2A and 2B are diagrams illustrating examples of hardware configurations of a mobile terminal apparatus and a management server according to the first embodiment.

The following describes embodiments with reference to the accompanying drawings.

First Embodiment

Overall System Configuration

Initially, a description is given, with reference to FIG. 1, of an overall configuration of an image transmission system 1 according to a first embodiment. FIG. 1 is a diagram illustrating an example of the overall configuration of the image transmission system 1 according to the first embodiment.

The image transmission system 1 illustrated in FIG. 1 includes a mobile terminal apparatus 10 and a management server 20 that are communicatively connected via a network N such as the Internet. The image transmission system 1 is communicatively connected via the network N to a customer environment E1 that is a company-specific system environment for a customer such as a company or an organization.

The customer environment E1 includes a mail server 30 having a function to save electronic mails of the employees of the company of the customer, and manage electronic mail addresses and the like and transmission and reception of the electronic mails. The "electronic mails" may hereinafter be called "mails".

The customer environment E1 may include PC terminals and the like used by the employees within the company in addition to the mail server 30.

The mobile terminal apparatus 10 includes various types of information processing apparatuses smartphones, mobile phones, tablet terminal, and notebook PC, which are used by the employees of the company. The mobile terminal apparatus 10 has an image transmission program 40 installed for transmitting the image data imaged by the mobile terminal apparatus 10 via mail to the mail server 30 residing in the customer environment E1.

The mobile terminal apparatus 10 according to the first embodiment that has the image transmission program 40 installed is capable of attaching the imaged data to a mail setting the own mail address of the mobile terminal apparatus 10 managed by the mail server 30 as an unchangeable transmission destination, subsequently sending the mail with the attached image data to the own mail address, and then deleting the image data and the like from the mobile terminal apparatus 10. The mobile terminal apparatus 10 according to the first embodiment may be able to prevent the image data from being divulged owing, for example, to loss or theft of the mobile terminal apparatus 10 or erroneous transmission of the mail. When detailed notes written on the whiteboard are imaged by the mobile terminal apparatus 10 in, for example, an external conference, the content of the conference may be prevented from being divulged.

The management server 20 is an information processing apparatus having an authentication function of the image transmission system 1. The management server 20 is installed with a server program 50 for authenticating the mobile terminal apparatuses 10, acquiring the mail addresses managed by the mail server 30, and the like. The management server 20 that has the server program 50 in response to a request from the mobile terminal apparatus 10 is capable of authenticating the corresponding mobile terminal apparatus 10, and acquiring the mail addresses managed by the mail server 30 residing in the customer environment E1.

FIG. 1 illustrates an example of the image transmission system 1 connected to the customer environment E1; however, the image transmission system 1 may be connected to two or more customer environments E1. For example, the image transmission system 1 may be connected to the customer environment E1 of a customer A, a customer environment E2 of a customer B, a customer environment E3 of a customer C, and the like.

Hardware Configuration

Figure 2B:
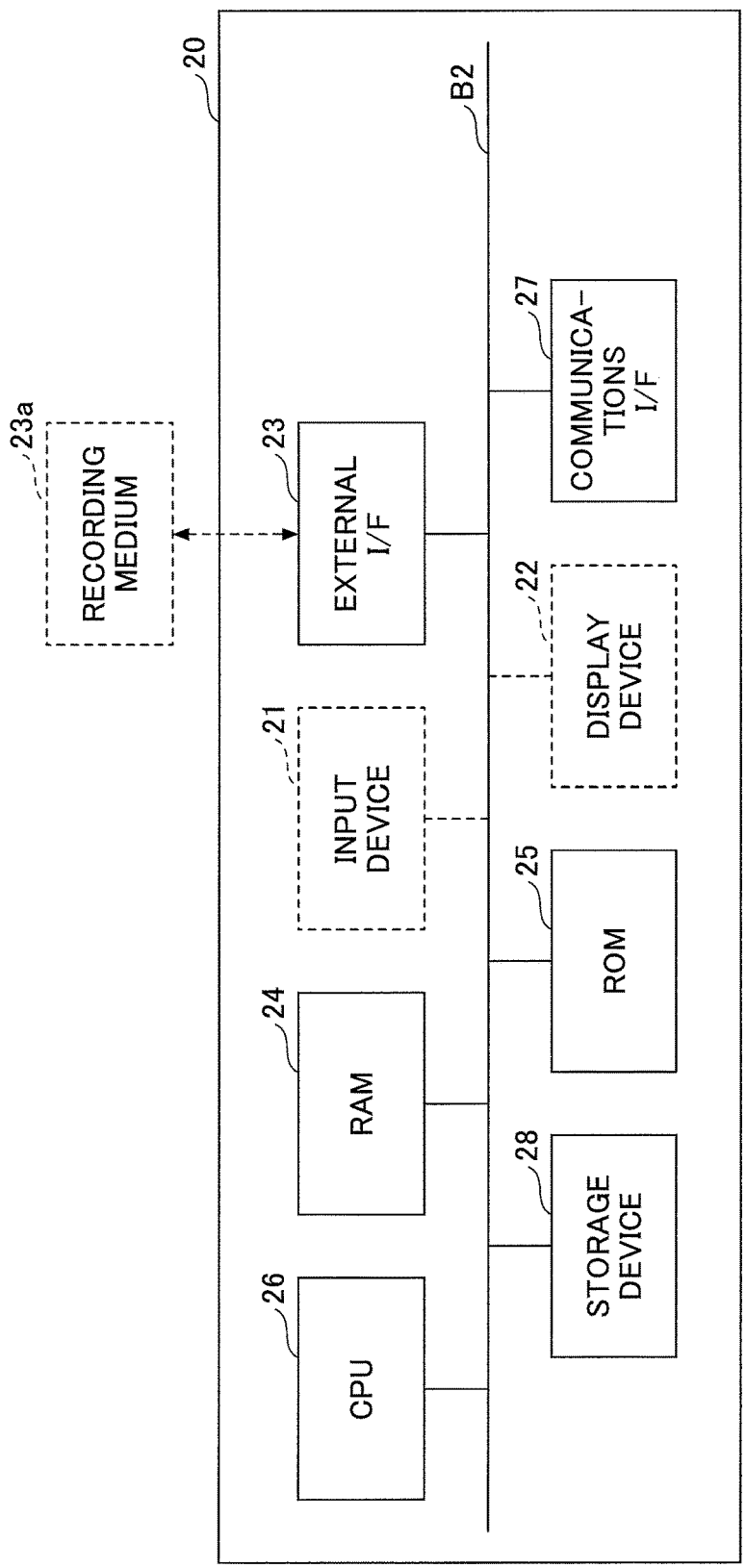

Next, an illustration is given, with reference to FIGS. 2A and 2B, of hardware configurations of the mobile terminal apparatus 10 and the management server 20 according to the first embodiment. FIGS. 2A and 2B are diagrams illustrating examples of hardware configurations of the mobile terminal apparatus 10 and the management server 20 according to the first embodiment.

As illustrated in FIG. 2A, the mobile terminal apparatus 10 includes an input device 11, a display device 12, an external I/F 13, a random access memory (RAM) 14, and a read only memory (ROM) 15. The mobile terminal apparatus 10 includes a central processing unit (CPU) 16, a communications I/F 17, a storage device 18, and a camera device 19. The above-described hardware components are mutually connected via a bus B1.

The input device 11 includes a touch panel, various types of buttons, a keyboard, and a mouse, and is configured to input various types of operational signals into the mobile terminal apparatus 10. The display device 12 includes a display and the like, and is configured to display various types of process results.

The external I/F 13 is an interface between the mobile terminal apparatus 10 and external devices. Examples of the external devices include a recording medium 13a and the like. The terminal apparatus 10 having the above-described hardware configuration may be able to read information from the recording medium 13a or write information on the recording medium 13a via the external I/F 13. Examples of the recording medium 13a includes an secure digital (SD) memory card and a universal serial bus (USB) memory.

The RAM 14 is a volatile semiconductor memory configured to temporarily store programs and data. The ROM 15 is a nonvolatile semiconductor memory configured to retain programs or data even when the power supply is turned off. The CPU 16 is a processor configured to load programs or data from the storage device 18 or the ROM 15 in the RAM 14 and execute the loaded programs to perform various types of processes.

The communications I/F 17 is an interface configured to connect the mobile terminal apparatus 10 to a network N. The mobile terminal apparatus 10 may thus be able to communicate with the management server 20 via the communications I/F 17.

The storage device 18 is a nonvolatile writable memory storing programs or data. Examples of the storage device 18 include a flash memory and the like. The programs or data stored in the storage device 18 include an operating system (OS) configured to control the mobile terminal apparatus 10 as a whole, and various types of programs (e.g., an image transmission program 40) operating on the OS.

The camera device 19 is configured to capture images to generate image data. In the following illustration, the images taken by the camera device 19 are described as still images; however, the images taken by the camera device 19 are not limited to the still images, and may be dynamic images such as videos. That is, the data generated by the camera device 19 are not limited to still image data, and may be dynamic data or video data.

The data generated by the camera device 19 are stored in the recording medium 13a, the RAM 14, or the storage device 18 specified by the OS installed in the mobile terminal apparatus 10. In the following description, data (image data generated by the camera device 19 are stored in the storage device 18.

The mobile terminal apparatus 10 according to the first embodiment that has the hardware configuration illustrated in FIG. 2A may implement later-described various types of processes.

As illustrated in FIG. 2B, the management server 20 includes an input device 21, a display device 22, an external I/F 23, and a RAM 24. The management server 20 further includes a ROM 25, a CPU 26, a communications I/F 27, and a storage device 28. The above-described hardware components are mutually connected via a bus B2.

The input device 21 includes a keyboard and a mouse, and is configured to input various types of operational signals into the management server 20. The display device 22 includes a display and the like, and is configured to display various types of process results. The input device 21 and the display device 22 may be optionally connected to the bus B2.

The external I/F 23 is an interface between the management server 20 and external devices. Examples of the external devices include a recording medium 23a and the like. The management server 20 having the above-described hardware configuration may be able to read information from the recording medium 23a or write information on the recording medium 23a via the external I/F 23. Examples of the recording medium 23a include a secure digital (SD) memory card, and a universal serial bus (USE) memory, and the like.

The RAM 24 is a volatile semiconductor memory configured to temporarily store programs and data. The ROM 25 is a nonvolatile semiconductor memory configured to retain programs or data even when the power supply is turned off. The CPU 26 is a processor configured to load programs or data from the storage device 28 or the ROM 25 in the RAM 24 and execute the loaded programs to perform various types of processes.

The communications I/F 27 is an interface configured to connect the management server 20 to the network N. The management server 20 may thus be able to communicate with the mobile terminal apparatus 10 and the mail server 30 via the communications I/F 27.

The storage device 28 is a nonvolatile writable memory storing programs or data. Examples of the storage device 28 include a hard disk drive (HDD), a solid state drive (SSD) and the like. The programs or data stored in the storage device 28 include an operating system (OS) configured to control the management server 20 as a whole, and various types of programs (e.g., a server program 50) operating on the OS.

The management server 20 according to the first embodiment that has the hardware configuration illustrated in FIG. 2B may implement later-described various types of processes.

Functional Configuration

Figure 3:
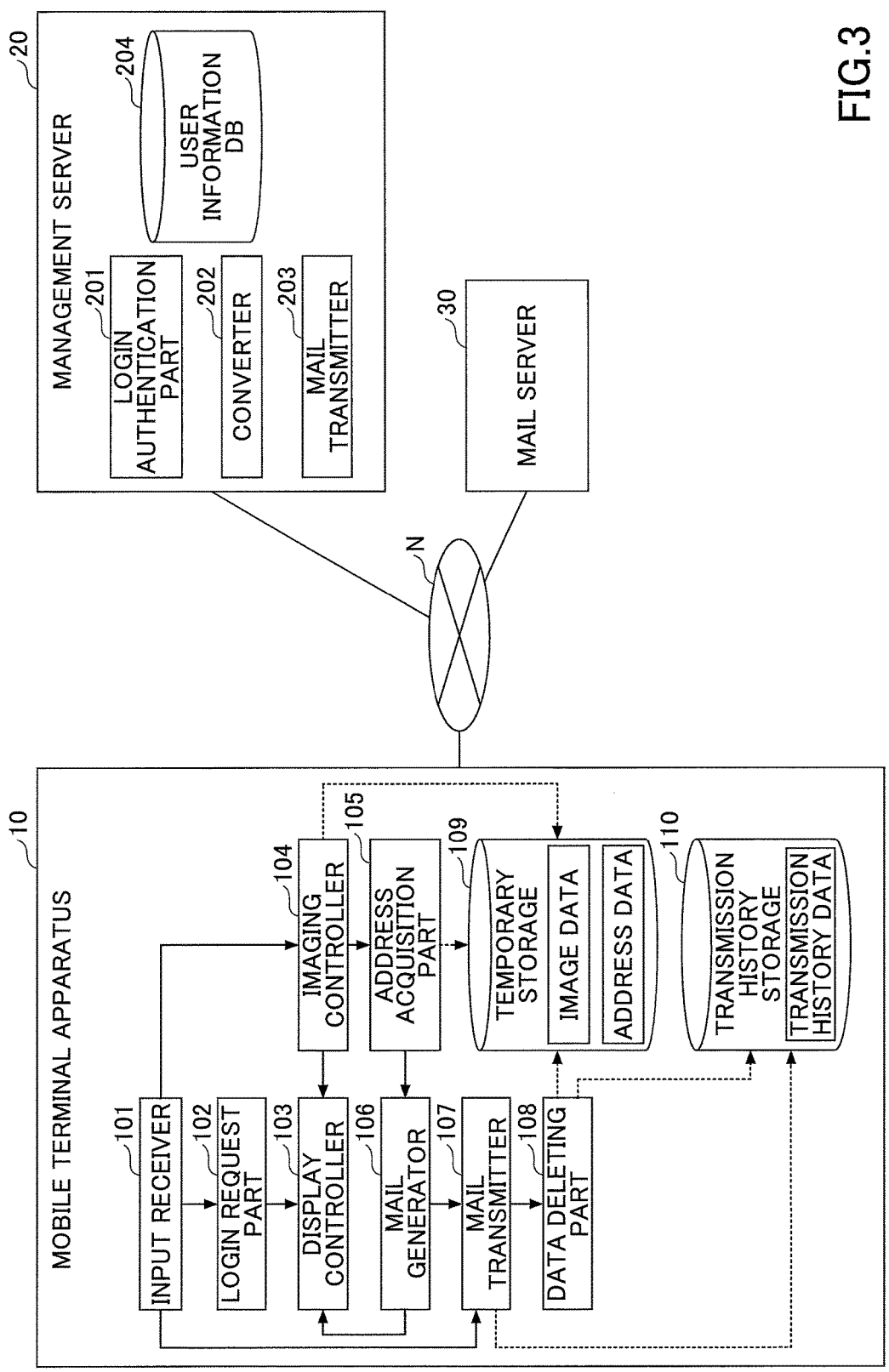
FIG. 3 is a diagram illustrating an example of a functional configuration of the image transmission system according to the first embodiment.

Next, a description is given, with reference to FIG. 3, of a functional configuration of the image transmission system 1 according to the first embodiment. FIG. 3 is a diagram illustrating an example of the functional configuration of the image transmission system 1 according to the first embodiment.

The mobile terminal apparatus 10 includes an input receiver 101, a login request part 102, a display controller 103, an imaging controller 104, an address acquisition part 105, a mail generator 106, a mail transmitter 107, and a data deleting part 108. The above components may be implemented by causing the CPU 16 to execute the image transmission program 40 installed in the mobile terminal apparatus 10.

The mobile terminal apparatus 10 further utilizes a temporary storage 109 and a transmission history storage 110. The above storage components may be implemented by using the storage device 18.

The input receiver 101 is configured to receive various types of operational inputs from a user. The input receiver 101 may, for example, receive a login operation from the user for using the image transmission system 1.

The login request part 102 is configured to transmit a login request to the management server 20, in response to the login operation received by the input receiver 101.

The display controller 103 is configured to display various types of screens on the display device 12. The display controller 103 may, for example, display a login screen on the display device 12 for allowing the user to perform the login operation. Similarly, the display controller 103 may display a mail transmission screen for allowing the user to transmit a mail generated by the mail generator 106.

The imaging controller 104 is configured to control the camera device 19 to generate image data of an image taken by the camera device 19. The imaging controller 104 stores the generated image data in the temporary storage 109.

The address acquisition part 105 is configured to acquire address data that is a transmission destination of the image data generated by the imaging controller 104. That is, the address acquisition part 105 transmits an acquisition request for the address data to the management server 20 to acquire via the management server 20 the address data indicating the mail address of the own mobile terminal apparatus 10 (the mail address of the user's mobile terminal apparatus 10) managed by the management server 20. The address acquisition part 105 is configured to store the acquired address data in the temporary storage 109.

The mail generator 106 is configured to generate a mail setting, as a transmission destination address, the mail address indicated by the address data acquired from the address acquisition part 105 to which the image data generated by the imaging controller 104 are attached. In this case, the mail generator 106 generates the above mail without having the mail address set as the transmission destination displayed on the display screen.

The mobile terminal apparatus 10 according to the first embodiment sets the mail address indicated by the address data acquired by the address acquisition part 105 as the transmission destination of the mail. The mobile terminal apparatus 10 according to the first embodiment will not display the mail address set as the transmission destination of the mail on the display screen. The mobile terminal apparatus 10 according to the first embodiment may thus be able to prevent the leakage of the image data, which may be caused by erroneous transmission of the mail to which the user sets a wrong mail address as the transmission destination.

Further, the mobile terminal apparatus 10 according to the first embodiment does not display the mail address set as the transmission destination of the mail. Accordingly, the user is unable to change the set mail address (correct or add the mail address). The image data or the like may thus be prevented from being divulged, which may be caused by erroneous transmission of the mail.

The mail transmitter 107 is configured to transmit the mail generated by the mail generator 106 in accordance with the mail transmission operation from the user received by the input receiver 101. The mail transmitter 107 that has completed the transmission of the mail stores transmission history data illustrating a transmission history of the mail in the transmission history storage 110.

The user of the mobile terminal apparatus 10 may thus be able to have access to the image data transmitted to the own mail address via the PC terminal placed in the customer environment E1 and the like.

The data deleting part 108 is configured to delete the address data of the mail and the image data attached to the mail from the temporary storage 109 as well as deleting the transmission history data of the mail from the transmission history storage 110.

The mobile terminal apparatus 10 according to the first embodiment thus deletes the image data, the address data and the transmission history data of the mail after the transmission of the mail with the attached image data as described above. The mobile terminal apparatus 10 having the above configuration may thus be able to prevent the image data and the like from being divulged even when the mobile terminal apparatus 10 is lost or stolen.

The temporary storage 109 is configured to temporarily store data. Examples of the data stored in the temporary storage 109 include the image data generated by the imaging controller 104 and the address data acquired by the address acquisition part 105.

The transmission history storage 110 is configured to store transmission history data of the mail transmitted by the mail transmitter 107.

Next, the management server 20 includes a login authentication part 201, a converter 202, and a mail transmitter 203. The above-described components may be implemented by causing the CPU 26 to execute the server program 50 installed in the management server 20.

The management server 20 also utilizes a user information database (hereinafter called a "user information DB") 204. The DB may be implemented by utilizing a storage device and the like that are connected, for example, to the storage device 28 or the management server 20 via the network N.

The login authentication part 201 is configured to refer to the user information DB 204 to perform login authentication in response to a login request from the mobile terminal apparatus 10. The login authentication part 201 performs login authentication based on determination as to whether the user information DB 204 includes a combination of a login ID and a login password included in the login authentication.

The login ID and the login password are authentication information for the user to log into the image transmission system 1 using the mobile terminal apparatus 10.

The converter 202 is configured to convert the login ID and the login password included in the acquisition request for the address data from the mobile terminal apparatus 10. That is, the converter 202 converts the login ID and the login password included in the acquisition request for the address data into a mail account and a mail password stored in association with the respective login ID and login password in the user information DB 204.

The mobile terminal apparatus 10 according to the first embodiment may be able to acquire an own mail address corresponding to the mail account and the mail password converted by the management server 20 from the mail server 30.

Upon reception of the mail from the mobile terminal apparatus 10, the mail transmitter 203 is configured to transmit the mail to the mail server 30 residing in the customer environment E1, based on the mail address set as the transmission destination of the mail.

The user information DB 204 is configured to manage user information. The following illustrates the user information DB 204 with reference to FIG. 4. FIG. 4 is a table illustrating an example of a user information DB.

As illustrated in FIG. 4, the user information DB 204 includes a login ID, a login password, a mail account, and a mail password as data items. More specifically, the user information DB 204 manages a combination of the login ID and the login password in association with a combination of the mail account and the mail password.

The login ID is identifier information uniquely identifying each user of the corresponding mobile terminal apparatus 10 in the image transmission system 1. The login password is a password corresponding to the login ID. The login ID and the login password are authentication information for the user of the mobile terminal apparatus 10 to log into the image transmission system 1.

The mail account is an account of the user of the mobile terminal apparatus 10 in the mail server 30 residing in the customer environment E1. The mail password is a password corresponding to the mail account.

The user information DB 204 includes the login ID and the login password for the user of the mobile terminal apparatus 10 to use the image transmission system 1 in association with the mail account and the mail password of the user in the mail server 30 as described above.

Details of Process

The following illustrates details of a process of the image transmission system 1 according to the first embodiment.

Figure 5:
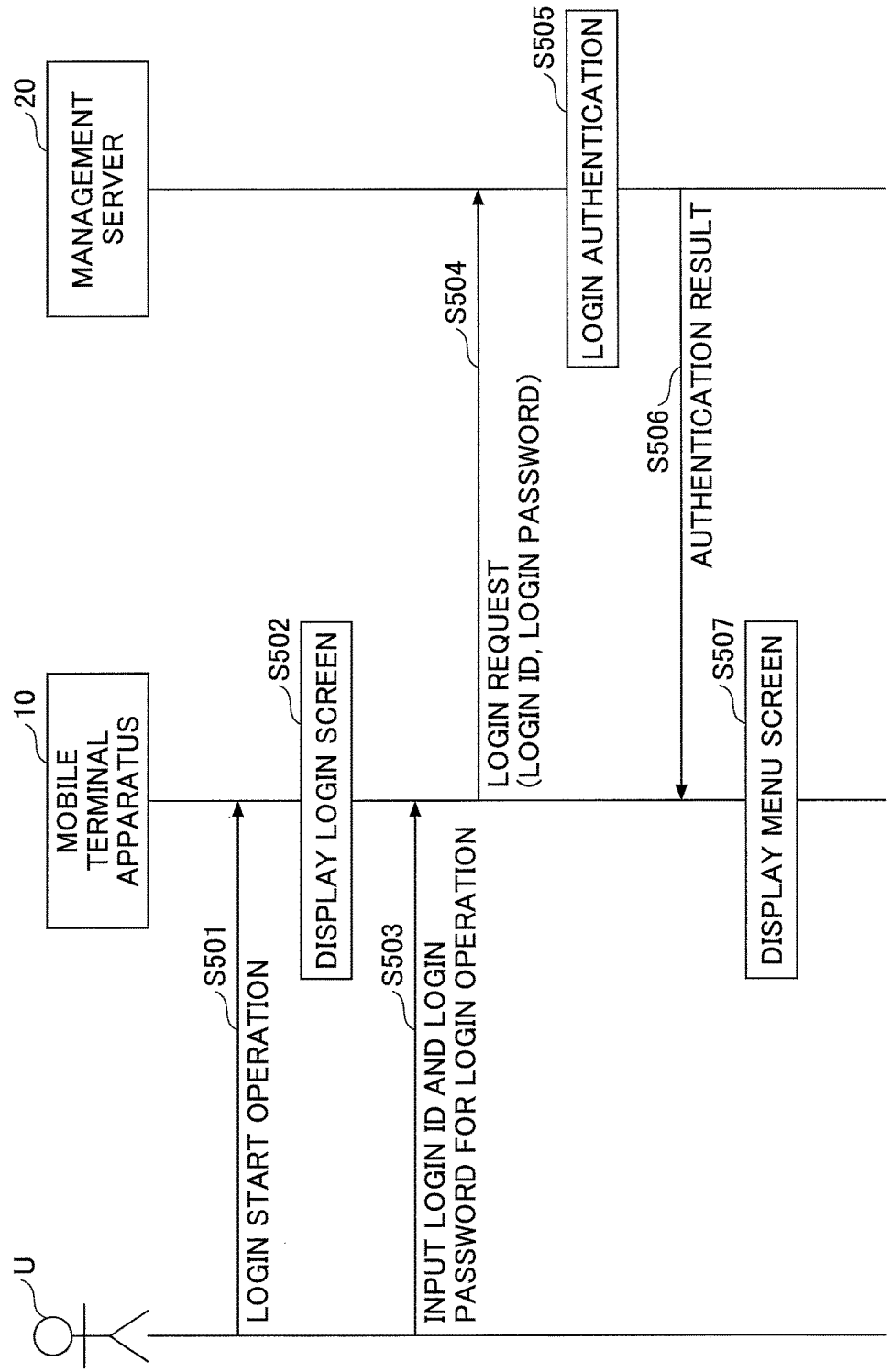
FIG. 5 is a sequence diagram illustrating an example of a login process according to the first embodiment.

Initially, an illustration is given, with reference to FIG. 5, of a process for a user U of the mobile terminal apparatus 10 to log in to the image transmission system 1. FIG. 5 is a sequence diagram illustrating an example of a login process according to the first embodiment.

The user U uses the mobile terminal apparatus 10 to perform an operation to start logging in to the image transmission system 1 (step S501). This process is achieved by allowing the user U to operate the mobile terminal apparatus 10 to activate the image transmission program 40.

Figure 6:
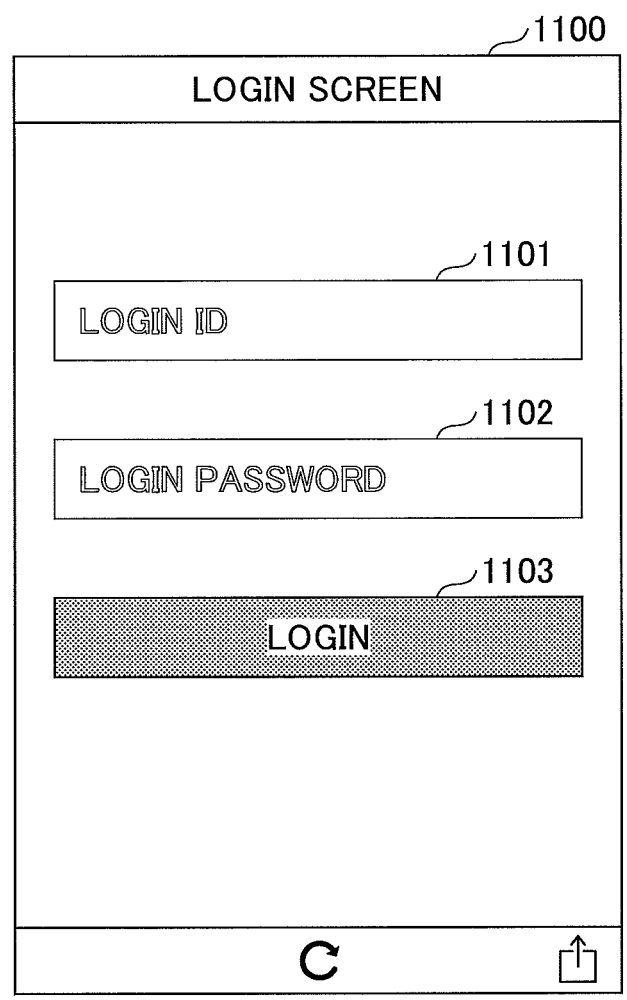
FIG. 6 is a diagram illustrating an example of a login screen.

The display controller 103 of the mobile terminal apparatus 10 displays, for example, a login screen 1100 illustrated in FIG. 6 on the display device 12 (step S502). FIG. 6 is a diagram illustrating an example of the login screen 1100. The login screen 1100 illustrated in FIG. 6 includes a login ID input field 1101, a login password input field 1102, and a login button 1103.

The user U inputs a login ID and a login password into the login ID input field 1101 and login password input field 1102, and then presses the login button 1103 to perform the login operation (step S503). The input receiver 101 of the mobile terminal apparatus 10 subsequently receives the login operation performed by the user U.

When the input receiver 101 receives the login operation, the login request part 102 of the mobile terminal apparatus 10 transmits a login request to the management server 20 (step S504). Note the login request includes the login ID input in the login ID input field 1101 and the login password input in the login password input field 1102 in step 503.

When the login authentication part 201 of the management server 20 receives the login request from the mobile terminal apparatus 10, the login authentication part 201 refers to the user information DB 204 to perform login authentication (step S505). That is, the login authentication part 201 determines whether the user information DB 204 includes a combination of the login ID and the login password included in the received login request.

The login authentication part 201 of the management server 20 transmits an authentication result to the mobile terminal apparatus 10 based on a determination result in step S505 (step S506). That is, when the login authentication part 201 determines that the user information DB 204 includes the combination of the login ID and the login password included in the login request, the login authentication part 201 transmits the authentication result indicating successful authentication to the mobile terminal apparatus 10. On the other hand, when the login authentication part 201 determines that the user information DB 204 does not include the combination of the login ID and the login password included in the login request, the login authentication part 201 transmits the authentication result indicating authentication failure to the mobile terminal apparatus 10.

The following illustration is based on the assumption that the login authentication part 201 of the management server 20 has transmitted the authentication result indicating successful authentication to the mobile terminal apparatus 10 in step S506.

Figure 7:
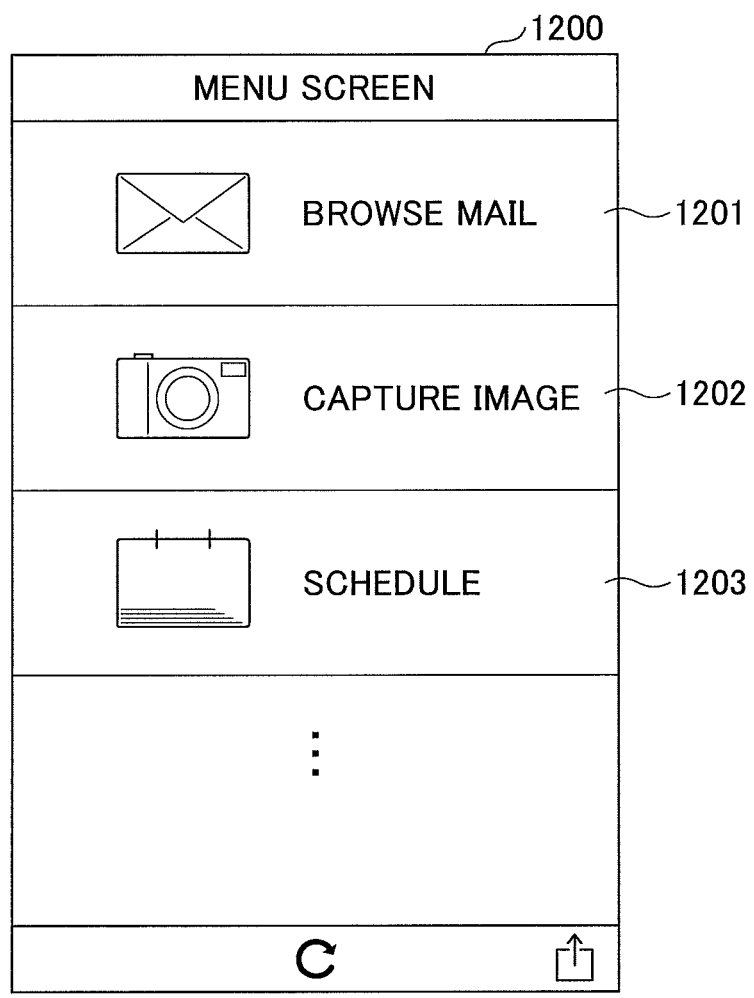
FIG. 7 is a diagram illustrating an example of a menu screen.

When the display controller 103 of the mobile terminal apparatus 10 receives the authentication result from the management server 20, the display controller 103 displays, for example, a menu screen 1200 illustrated in FIG. 7 on the display device 12 (step S507). FIG. 7 is a diagram illustrating an example of the menu screen 1200. The menu screen 1200 illustrated in FIG. 7 includes various types of menus including a "browse mail" 1201, a "capture image" 1202, and a "schedule" 1203.

As described above, then the user U logs into the image transmission system 1, the mobile terminal apparatus 10 displays the menu screen 1200. The menu screen 1200 may display various types of menus including the "browse mail" 1201 for browsing a web mail and the like, the "capture image" 1202 for capturing an image to transmit the captured image data via the mail, and the "schedule" 1203 for verifying the registered schedule. The menu screen 1200 thus displays a list of the functions implemented by various types of programs including the image transmission program 40.

Figure 8:
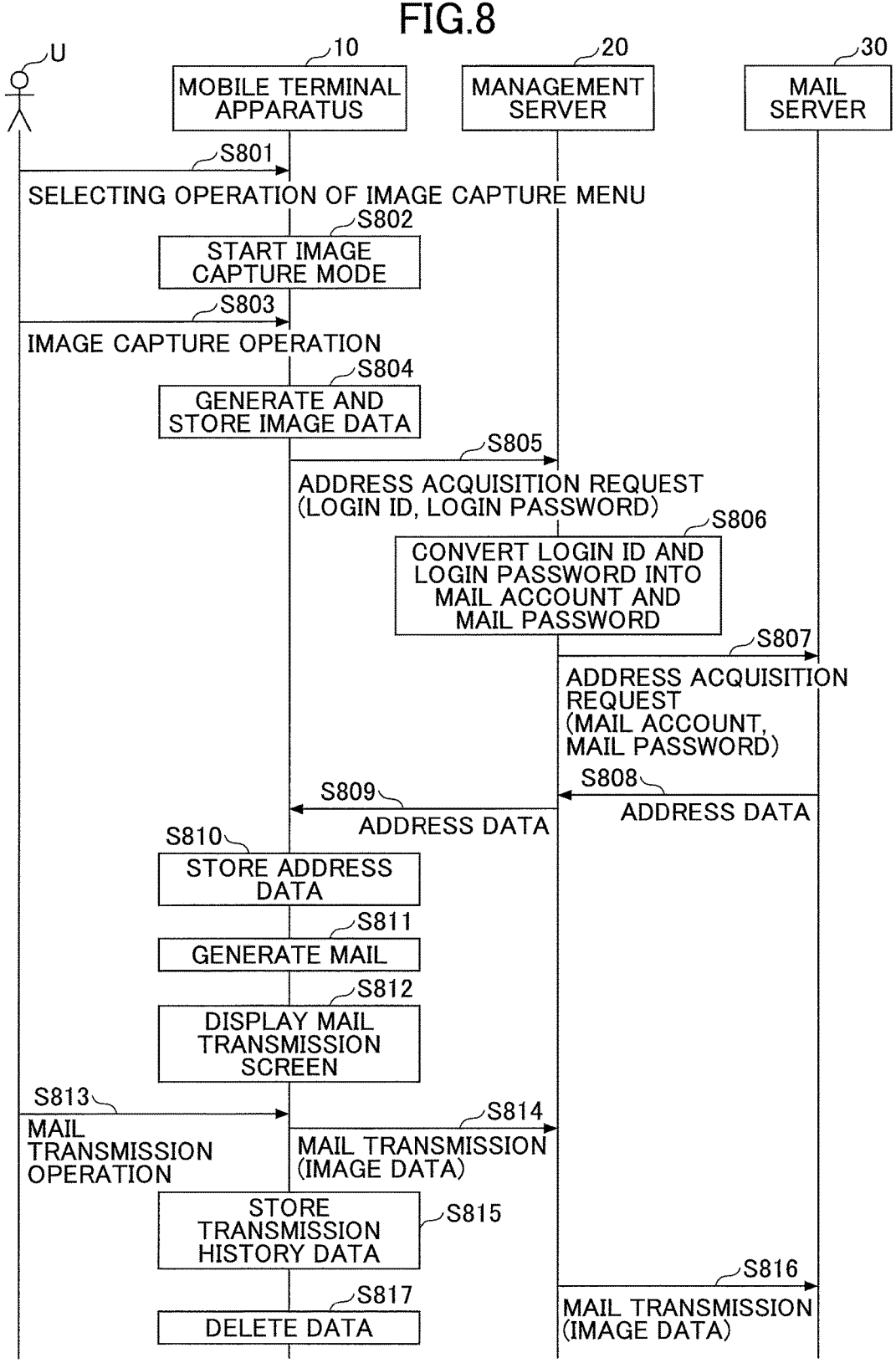
FIG. 8 is a sequence diagram illustrating an example of an image transmission process according to the first embodiment.

Next, an illustration is given, with reference to FIG. 8, of a process when the user U selects the "capture image" 1202 on the menu screen 1200. FIG. 8 is a sequence diagram illustrating an example of an image transmission process according to the first embodiment.

The user U performs an operation to select the "capture image" 1202 from the menu screen 1200 displayed on the display device 12 of the mobile terminal apparatus 10 (step S801). The input receiver 101 of the mobile terminal apparatus 10 then receives the selection operation.

Figure 9:
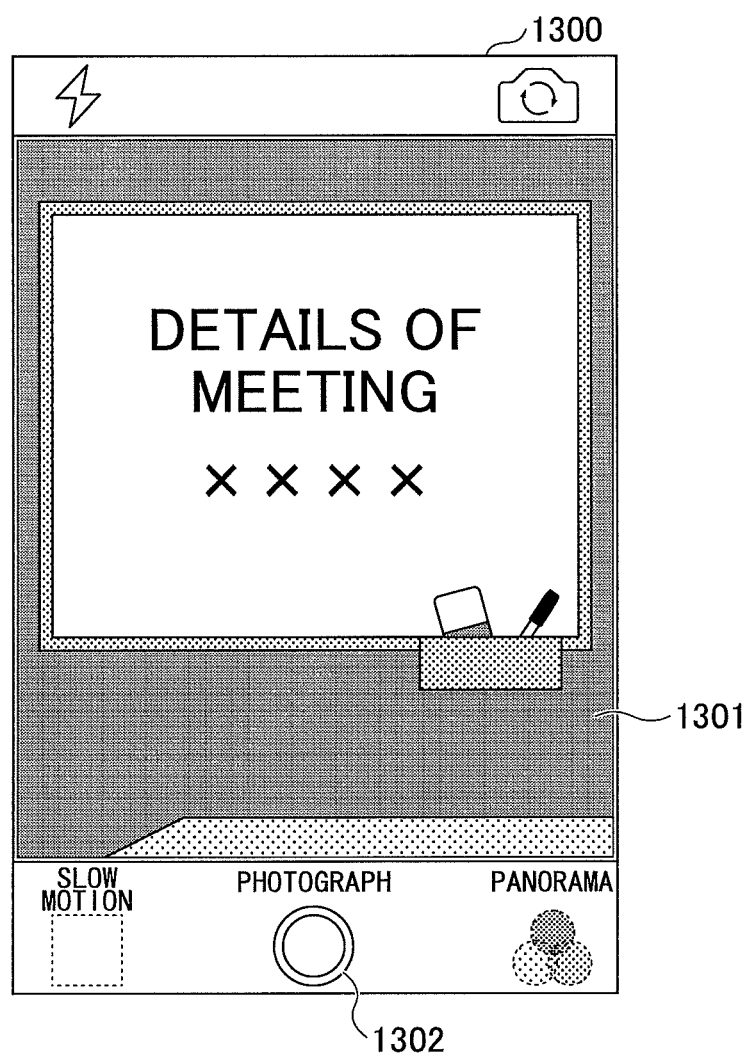
FIG. 9 is a diagram illustrating an example of an image capturing screen.

When the input receiver 101 receives the selection operation, the imaging controller 104 of the mobile terminal apparatus 10 activates the camera device 19 to start image capture mode and display an image capture screen 1300 illustrated in FIG. 9. FIG. 9 is a diagram illustrating an example of the image capture screen 1300.

The image capture screen 1300 illustrated in FIG. 9 is used to capture an image with the camera device 19. The user U presses an imaging button 1302 while displaying an object subject to imaging within an imaging area of the image capture screen 1300 to capture the object subject to imaging displayed on the imaging area 1301 with the camera device 19.

Note that an image capture mode indicates an image capture mode (an image capture mode of the camera device 19) implementing an image transmission process according to the first embodiment. The image data of the image captured in the image capture mode will be deleted from the mobile terminal apparatus 10 after the transmission of the mail with the attached image data to a predetermined address as described later. Note that the mobile terminal apparatus 10 may have various types of modes other than the image capture mode, such as a video capture mode for imaging video data and voice collecting mode for acquiring voice data.

The user U presses an imaging button 1302 to perform an operation to capture an image displayed on the display device 12 of the mobile terminal apparatus 10 (step S803). The input receiver 101 of the mobile terminal apparatus 10 receives the image capture operation.

The imaging controller 104 of the mobile terminal apparatus 10 has received the image capture operation via the input receiver 101 controls the camera device 19 to capture an image within the imaging area 1301 and generates the image data. The imaging controller 104 stores the generated image data in the temporary storage 109 (step S804).

Figure 10:
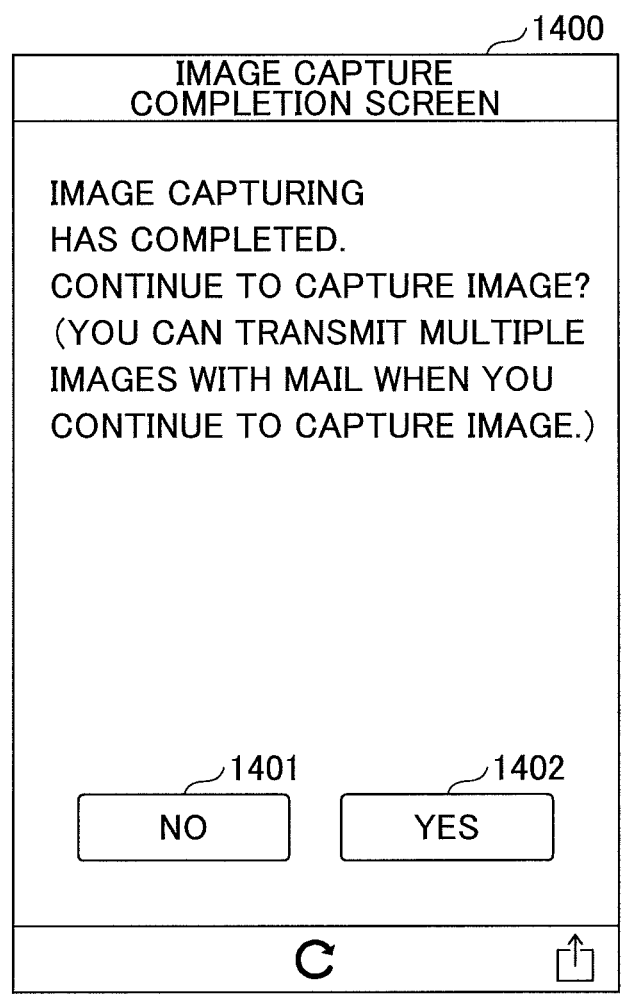
FIG. 10 is a diagram illustrating an example of a capturing completion screen.

Note that the display controller 103 of the mobile terminal apparatus 10 may display an image capture completion screen 1400 illustrated in FIG. 10 when the imaging controller 104 has stored the image data in the temporary storage 109. FIG. 10 is a diagram illustrating an example of the image capture screen 1400. The image capture screen 1400 illustrated in FIG. 10 includes a "NO" button 1401 and a "YES" button 1402 for selecting whether to continue to perform an image capture operation.

When the user U selects the "NO" button 1401 on the image capture completion screen 1400, the mobile terminal apparatus 10 proceeds with a nest step S805. On the other hand, when the user U selects the "YES" button 1402, the mobile terminal apparatus 10 returns to step S802 to cause the imaging controller 104 to activate the image capture mode again. The user U may thus be able to capture two or more images. The mobile terminal apparatus 10 may be able to transmit a mail with the two or more imaged data attached to a predetermined address in a later-described process as a result.

Subsequently, when the imaging controller 104 stores the image data in the temporary storage 109, the address acquisition part 105 of the mobile terminal apparatus 10 transmits an acquisition request for address data of a transmission destination mail address to the management server 20 (step S805). Note that the acquisition request for the address data includes a login ID and a login password of the user U.

The converter 202 of the computer 200 that has received the acquisition request for the address data refers to the user information DB 204 to respectively convert the login ID and the login password included in the acquisition request into a mail account and a mail password (step S806). That is, the converter 202 converts the login ID and the login password included in the acquisition request for the address data into a mail account and a mail password stored in association with the respective login ID and login password in the user information DB 204.

The management server 20 converts the login ID and login password of the user U in the image transmission system 1 into the mail account and the mail password of the user U in the mail server 30 installed in the customer environment E1 as described above. The mobile terminal apparatus 10 of the user U may thus be able to acquire the mail address of the user U managed by the mail server 30 as address data via the management server 20.

The converter 202 of the management server 20 transmits the acquisition request for the address data including the mail account and the mail password to the mail server 30 (step S807).

The mail server 30 that has received the acquisition request for the address data returns a mail address corresponding to the mail account as address data based on the mail account and the mail password included in the acquisition request (step S808).

The converter 202 of the management server 20 that has received the address data returned from the mail server 30 transmits (forwards) the received address data to the mobile terminal apparatus 10 (step S809).

The address acquisition part 105 of the mobile terminal apparatus 10 that has received the address data from the management server 20 stores the received address data into the temporary storage 109 (step S810).

The mail generator 106 of the mobile terminal apparatus 10 subsequently acquires the image data and the address data from the temporary storage 109. The mail generator 106 then generates a mail having the mail address indicated by the address data set as the transmission destination address and having the image data attached (step S811). In this step, the mail generator 106 generates the above mail without having the mail address set as the transmission destination displayed on the display screen.

Figure 11:
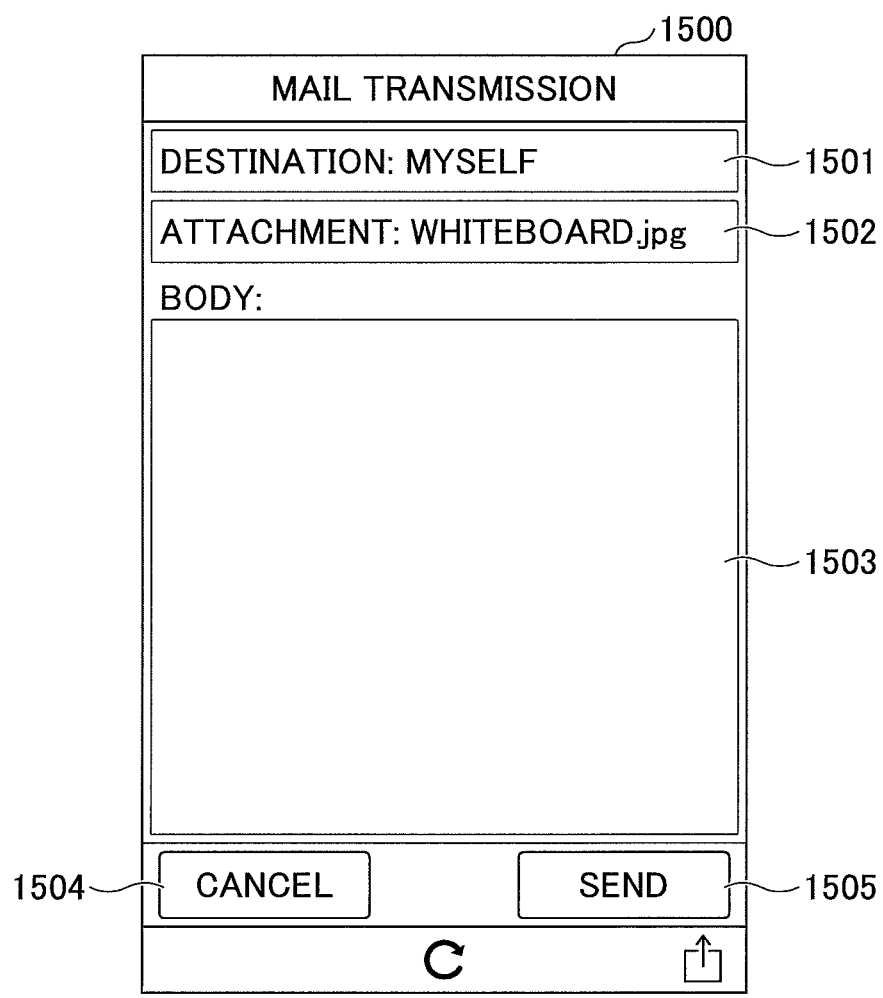
FIG. 11 is a diagram illustrating an example of a mail transmission screen.

The display controller 103 of the mobile terminal apparatus 10 subsequently displays on the display device 12 a screen for transmitting the mail generated by the mail generator 106 (step S812). That is, the display controller 103 displays, for example, a mail transmission screen 1500 illustrated in FIG. 11. FIG. 11 is a diagram illustrating an example of the mail transmission screen 1500. The mail transmission screen 1500 illustrated in FIG. 11 includes a transmission destination field 1501, an attachment file field 1502, a body field 1503, a "cancel" button 1504, and a "send" button 1505.

In the mail transmission screen 1500 illustrated in FIG. 11, the transmission destination field 1501 only displays "myself" and does not display the mail address indicating the transmission destination address. The user U will not be allowed, for example, to edit the transmission destination field 1501 to add another transmission destination address, and change or correct the transmission destination address. The above configuration may be able to prevent erroneous mail transmission due to a wrong transmission destination address set by the user U. The mobile terminal apparatus 10 according to the first embodiment may be able to prevent the image data set (attached) to the attachment file field 1502 from being divulged due to the erroneous transmission of the mail.

Note that the mail transmission screen 1500 in FIG. 11 depicts an example having the transmission destination field 1501 display the "myself"; however, the mail transmission screen 1500 is not limited to this example. The mail transmission screen 1500 may be configured to have no transmission destination field 1501 itself or to display the transmission destination address in a form not editable by the user U in the transmission destination field 1501. That is, the mail transmission screen 1500 may be in any form not allowing the user to add, change, or correct the transmission destination address.

The user U subsequently presses the "send" button 1505 on the mail transmission screen 1500 to perform a mail transmission operation (step S813). The input receiver 101 of the mobile terminal apparatus 10 then receives the mail transmission operation. In this step, the user U may input a predetermined message in the body field 1503 of the 1500.

Note that when the user U presses the "cancel" button 1504 on the mail transmission screen 1500, the mobile terminal apparatus 10 may end the process.

The mail transmitter 107 of the mobile terminal apparatus 10 that has received the mail transmission operation from the input receiver 101 transmits the mail generated by the mail generator 106 to the management server 20 (step S814).

The mail transmitter 107 of the mobile terminal apparatus 10 that has completed the transmission of the mail generated by the mail generator 106 stores transmission history data indicating a transmission history of the mail into the transmission history storage 110 (step S815). Note that the transmission history data may include an attached file of the transmitted mail and content set in the mail body in addition to the information indicating transmission date of the mail transmitted by the mail transmitter 107, the transmission source mail address, and the transmission destination address.

The mail transmitter 203 of the management server 20 that has received the mail from the mobile terminal apparatus 10 transmits the mail to the mail server 30 based on the mail address set as the transmission destination of the mail (step S816). The image data captured by the user U with the mobile terminal apparatus 10 is thus transmitted to the mail address of the user U himself/herself.

On the other hand, when the transmission of the mail has complete, the data deleting part 108 deletes the address data of the mail and the image data attached to the mail from the temporary storage 109 as well as deleting the transmission history data of the mail from the transmission history storage 110 (step S817). Thus, the information about the transmission destination mail address of the image data is deleted in addition to the image data captured by the user U with the mobile terminal apparatus 10. The mobile terminal apparatus 10 according to the first embodiment may thus be able to prevent the image data and the like from being divulged even if the mobile terminal apparatus 10 is lost or stolen.

Note that the data deleting part 108 that has deleted the image data and the transmission history data does not necessarily delete the address data of the transmitted mail. However, it may be preferable that the data deleting part 108 delete the address data of the transmitted mail together with the image data and the transmission history data.

Note that the example where the image data captured via the mobile terminal apparatus 10 is transmitted via the mail is illustrated in the first embodiment; however, the first embodiment is not limited to this example. The voice data recorded via the mobile terminal apparatus 10 may be transmitted via the mail in the first embodiment. That is, the image transmission system 1 according to the first embodiment may be applied similarly to the examples where content data such as the image data, the video data, and the voice data acquired by the mobile terminal apparatus 10 are transmitted to the mail address of the user U herself/himself.

Second Embodiment

Next, a description is given of a second embodiment. The second embodiment illustrates an example where the image data captured by the mobile terminal apparatus 10 are compressed and encrypted, and the compressed and encrypted image data are transmitted via the mail. Note that in the second embodiment, an illustration is given mainly of the difference between the first embodiment and the second embodiment, and a duplicated illustration is thus omitted from the specification by assigning the same reference numbers to components that are similar to those in the first embodiment.

Functional Configuration

Figure 12:
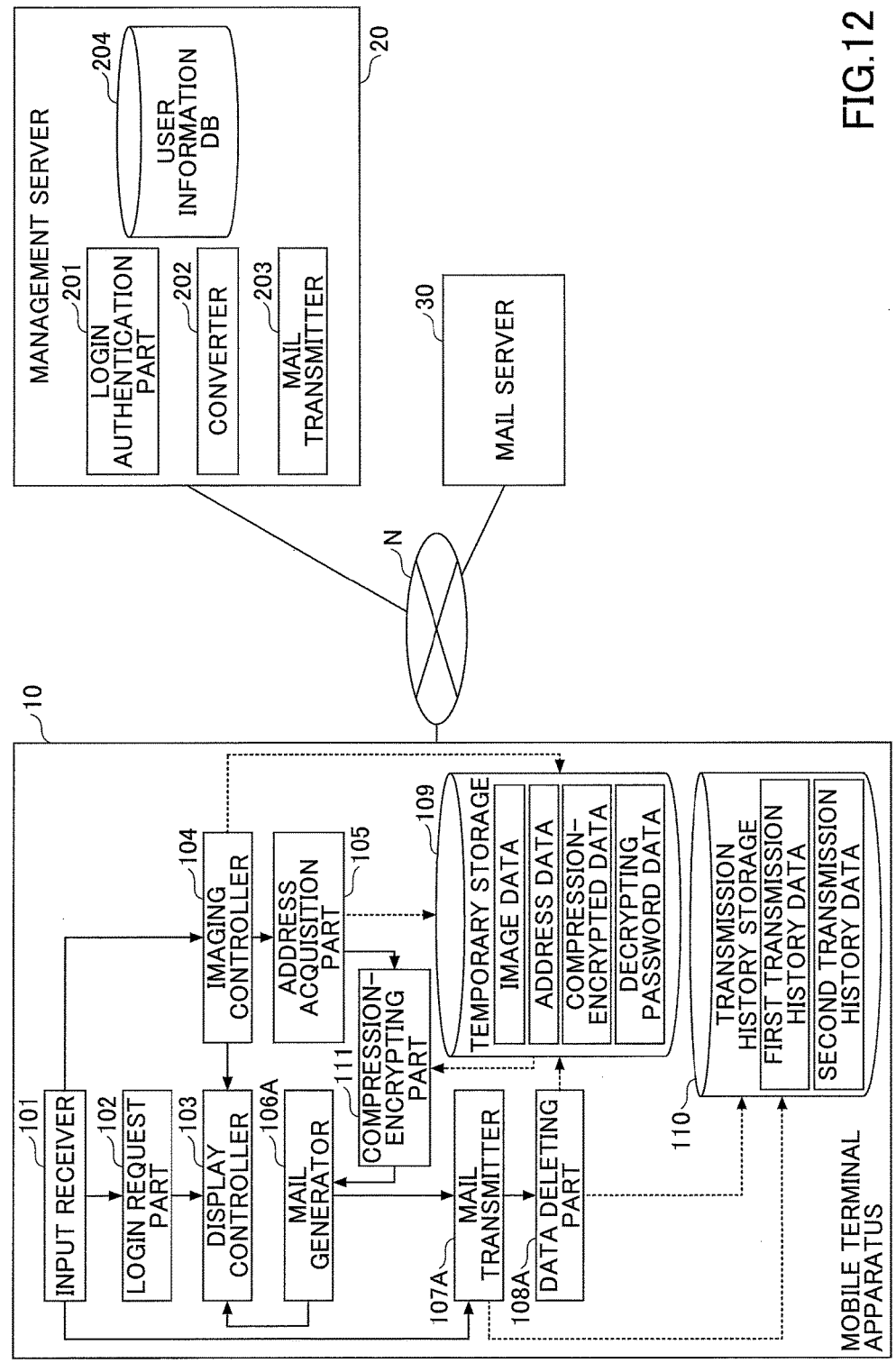
FIG. 12 is a diagram illustrating an example of a functional configuration of an image transmission system according to a second embodiment.

Initially, a description is given, with reference to FIG. 12, of an overall configuration of an image transmission system 1 according to a second embodiment. FIG. 12 is a diagram illustrating an example of the functional configuration of the image transmission system 1 according to the second embodiment.

The mobile terminal apparatus 10 includes a mail generator 106A, a mail transmitter 107A, a data deleting part 108A, and a compression-encrypting part 111.

The compression-encrypting part 111 is configured to compress image data generate by the imaging controller 104 and encrypt the compressed image data to generate compression-encrypted data. Generating the compression-encrypted data may reduce a size of the mail transmitted by the mail transmitter 107A as well as preventing the image data from being divulged when the transmitting mail is subject to eavesdropping. The compression-encrypting part 111 further generates decrypting password data for decrypting the compression-encrypted data. Note that the compression-encrypting part 111 stores the compression-decrypted data and the decrypting password data in the temporary storage 109.

The mail generator 106A is configured to generate a first mail having the compression-encrypted data generated by the compression-encrypting part 111 and having a mail address indicated by the address data set as a transmission destination address. The mail generator 106A further generates a second mail having the decrypting password indicated by the decrypting password data set in the body of the mail and having the mail address indicated by the address data set as the transmission destination address.

The mail transmitter 107A is configured to transmit the first mail and the second mail generated by the mail generator 106A to the management server 20. The mail transmitter 107A transmits each of the first mail and the second mail to the same address via the management server 20. Note that the mail transmitter 107A that has completed the transmission of the first mail stores first transmission history data illustrating a transmission history of the first mail in the transmission history storage 110. Similarly, the mail transmitter 107A that has completed the transmission of the second mail stores second transmission history data illustrating a transmission history of the second mail in the transmission history storage 110.

When the mail transmitter 107A has completed the transmission of the first mail and the second mail, the data deleting part 108A deletes the address data, the image data, the compression-encrypted data, and the decrypting password data from the temporary storage 109. The data deleting part 108A similarly deletes the first transmission history data and the second transmission history data from the transmission history storage 110.

Details of Process

The following illustrates details of a process of the image transmission system 1 according to the second embodiment. Note that a login process of the second embodiment that is similar to that of the first embodiment is omitted from the specification, and a description given below is mainly given, with reference to FIG. 13, of an image transmission process according to the second embodiment. FIG. 13 is a sequence diagram illustrating an example of the image transmission process according to the second embodiment. Note that steps S1301 to S1310 according to the second embodiment in FIG. 13 are similar to steps S801 to S810 according to the first embodiment in FIG. 8, and a duplicated illustration is thus omitted from the specification.

The compression-encrypting part 111 of the mobile terminal apparatus 10 compresses the image data stored in the temporary storage 109 and encrypts the compressed image data to generate the compression-encrypted data (step S1311). The compression-encrypting part 111 further generates decrypting password data for decrypting the compression-encrypted data in this step. Note that the compression-encrypting part 111 may generate as decrypting password data a character string having alphanumeric characters randomly arranged in a predetermined length to serve as a decrypting password.

The compression-encrypting part 111 of the mobile terminal apparatus 10 subsequently stores the compression-encrypted data and the decrypting password data in the temporary storage 109 (step S1312).

The mail generator 106A of the mobile terminal apparatus 10 subsequently acquires the compression-encrypted data and the address data from the temporary storage 109. The mail generator 106A then generates a first mail having the mail address indicated by the address data set as the transmission address and having the compression-encrypted data attached (step S1313). The mail generator 106A generates the first mail without having the mail address set as the transmission address displayed on the display screen.

The display controller 103 of the mobile terminal apparatus 10 subsequently displays on the display device 12 a mail transmission screen for transmitting the first mail generated by the mail generator 106A (step S1314). Note that in this step, the mail transmission screen displayed by the display controller 103 on the display device 12 is similar to the mail transmission screen 1500 illustrated in FIG. 11. However, the compression-encrypted data generated by the compression-encrypting part 111 is attached to the attachment file field 1502.

The user U performs a first mail transmission operation on the mail transmission screen (step S1315). The input receiver 101 of the mobile terminal apparatus 10 then receives the first mail transmission operation.

The mail transmitter 107A of the mobile terminal apparatus 10 that has received the first mail transmission operation from the input receiver 101 transmits the first mail generated by the mail generator 106A to the management server 20 (step S1316).

Note that the mail transmitter 107A of the mobile terminal apparatus 10 that has completed the transmission of the first mail stores first transmission history data illustrating a transmission history of the first mail in the transmission history storage 110 (step S1317).

The mail transmitter 203 of the management server 20 that has received the first mail from the mobile terminal apparatus 10 transmits the first mail to the mail server 30 based on the mail address set as the transmission destination of the first mail (step S1318). The image data captured by the user U with the mobile terminal apparatus 10 that has been compressed and encrypted is thus transmitted to the mail address of the user U himself/herself.

The mail generator 106A of the mobile terminal apparatus 10 subsequently acquires the decrypting password data from the temporary storage 109. The mail generator 106A then generates a second mail having the mail address indicated by the address data set as the transmission address and having the decrypting password indicated by the decrypting password data set in the body of the second mail (step S1319).

When the mail generator 106A has generated the second mail, the mail transmitter 107A of the mobile terminal apparatus 10 subsequently transmits the second mail to the management server 20 (step S1320).

The mail transmitter 107A of the mobile terminal apparatus 10 that has completed the transmission of the second mail stores second transmission history data illustrating a transmission history of the second mail in the transmission history storage 110 (step S1321).

The mail transmitter 203 of the management server 20 that has received the second mail from the mobile terminal apparatus 10 transmits the second mail to the mail server 30 based on the mail address set as the transmission destination of the second mail (step S1322). The decrypting password for decrypting the compression-encrypted data attached to the second mail is transmitted to the mail address of the user U via the second mail differing from the first mail.

On the other hand, when the mail transmitter 107A has completed the transmission of the first mail and the second mail, the data deleting part 108A of the mobile terminal apparatus 10 deletes the address data, the image data, the compression-encrypted data, and the decrypting password data from the temporary storage 109. The data deleting part 108A similarly deletes the first transmission history data and the second transmission history data from the transmission history storage 110 (step S1323). The image data, the compression-encrypted data, the decrypting password data, the first transmission history data, and the second transmission history data stored in the mobile terminal apparatus 10 are thus deleted.

In the image transmission system 1 according to the second embodiment, the image data captured by the user U with the mobile terminal apparatus 10 may be compressed and encrypted, and the compression-encrypted data are subsequently transmitted to the mail address of the user U himself/herself. Accordingly, when the mail is subject to eavesdropping or the like, the image data may be prevented from being divulged as well as reducing the size of the mail compared to the case in the image transmission system 1 according to the first embodiment. Note that in the image transmission system 1 according to the second embodiment, the image data are both compressed and encrypted; however, the image data may be either compressed or encrypted alone.

According to an aspect of embodiments, content data may be prevented from being divulged.

The embodiments of the present invention are described above. However, the present invention is not limited to the specifically disclosed embodiments, and variations and modifications may be made without departing from the scope of the present invention.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiments of the present invention have been described in detail, it should be understood that the various changes, substitutions, and alterations could be made hereto without departing from the spirit and scope of the invention.

What is claimed is:

1. A mobile terminal apparatus comprising:
   a storage configured to store a program;
   a display device; and
   a processor configured to execute the program to perform a process including:
      storing, in the storage, content data acquired in a predetermined mode of the mobile terminal apparatus;
      acquiring an address corresponding to authentication information that is input at a time of an authentication when the content data are acquired in the predetermined mode;
      generating a first mail to which the content data are attached, to unchangeably set the address acquired by the acquiring as a transmission destination of the first mail without displaying the set address on the display device;
      transmitting the first mail, generated by the generating, to the set address; and
      controlling deletion of the content data stored in the storage and deletion of a transmission history of the first mail transmitted by the transmitting.

2. The mobile terminal apparatus according to claim 1, wherein the processor is configured to execute the program to perform the process further including:
   encrypting the content data stored in the storage,
   wherein the generating includes generating the first mail to which the content data encrypted in the encrypting are attached, and
   wherein the transmitting includes transmitting a decrypting password for decrypting the content data encrypted by the encrypting to the set address by a second mail that is different from the first mail.

3. The mobile terminal apparatus according to claim 2, wherein the controlling deletes the content data stored in the storage and deletes the transmission history after transmissions of the first mail and the second mail are completed.

4. The mobile terminal apparatus according to claim 1, wherein the controlling further deletes the set address.

5. The mobile terminal apparatus according to claim 1, wherein the content data include at least one of image data, video data, and voice data.

6. The mobile terminal apparatus according to claim 1, further comprising:
   a camera device configured to capture and acquire image data or video data,
   wherein the storing stores, in the storage, the image data or the video data captured and acquired by the camera device in the predetermined mode.

7. A non-transitory computer-readable storage medium having stored therein a program for causing a computer to execute a process comprising:
   storing, in a memory, content data acquired in a predetermined mode;
   acquiring an address corresponding to authentication information that is input at a time of an authentication when the content data are acquired in the predetermined mode;
   generating a first mail to which the content data are attached, to unchangeably set the address acquired by the acquiring as a transmission destination of the first mail without displaying the set address on a display device;
   transmitting the first mail, generated by the generating, to the set address; and
   controlling deletion of the content data stored in the memory and deletion of a transmission history of the first mail transmitted by the transmitting.

8. The non-transitory computer-readable storage medium according to claim 7, wherein the program causes the computer to execute the process further comprising:
   encrypting the content data stored in the memory,
   wherein the generating includes generating the first mail to which the content data encrypted in the encrypting are attached, and
   wherein the transmitting includes transmitting a decrypting password for decrypting the content data encrypted by the encrypting to the set address by a second mail that is different from the first mail.

9. The non-transitory computer-readable storage medium according to claim 8, wherein the controlling deletes the content data stored in the memory and deletes the transmission history after transmissions of the first mail and the second mail are completed.

10. The non-transitory computer-readable storage medium according to claim 7, wherein the controlling further deletes the set address.

11. A control method to be implemented in an information processing apparatus that includes a processor, a memory, and a display device, the control method comprising:
   storing, by the processor, content data acquired in a predetermined mode of the information processing apparatus in the memory;
   acquiring, by the processor, an address corresponding to authentication information that is input at a time of an authentication when the content data are acquired in the predetermined mode;
   generating, by the processor, a first mail to which the content data are attached, to unchangeably set the address acquired by the acquiring as a transmission destination of the first mail without displaying the set address on the display device;
   transmitting, by the processor, the first mail, generated by the generating, to the set address; and controlling, by the processor, deletion of the content data stored in the memory and deletion of a transmission history of the first mail transmitted by the transmitting.

12. The control method according to claim 11, further comprising:
encrypting, by the processor, the content data stored in the memory,
wherein the generating includes generating the first mail to which the content data encrypted in the encrypting are attached, and
wherein the transmitting includes transmitting a decrypting password for decrypting the content data encrypted by the encrypting to the set address by a second mail that is different from the first mail.

13. The control method according to claim 12, wherein the controlling deletes the content data stored in the memory and deletes the transmission history after transmissions of the first mail and the second mail are completed.

14. The control method according to claim 11, wherein the controlling further deletes the set address.

15. A mobile terminal apparatus comprising:
a storage configured to store a program;
a display device; and
a processor configured to execute the program to perform a process including:
storing acquired content data in the storage;
acquiring an address corresponding to authentication information that is input at a time of an authentication when the content data are acquired;
generating a mail to which the content data are attached, to unchangeably set the address acquired by the acquiring as a transmission destination of the mail without displaying the set address on the display device;
transmitting the mail, generated by the generating, to the set address; and
controlling deletion of the content data stored in the storage.

16. A non-transitory computer-readable storage medium having stored therein a program for causing a computer to execute a process comprising:
storing, in a memory, content data that are acquired;
acquiring an address corresponding to authentication information that is input at a time of an authentication when the content data are acquired;
generating a mail to which the content data are attached, to unchangeably set the address acquired by the acquiring as a transmission destination of the mail without displaying the set address on a display device;
transmitting the mail, generated by the generating, to the set address; and
controlling deletion of the content data stored in the memory.

17. A control method to be implemented in an information processing apparatus that includes a processor, a memory, and a display device, the control method comprising:
storing, by the processor, content data that are acquired in the memory;
acquiring, by the processor, an address corresponding to authentication information that is input at a time of an authentication when the content data are acquired;
generating, by the processor, a mail to which the content data are attached, to unchangeably set the address acquired by the acquiring as a transmission destination of the mail without displaying the set address on the display device;
transmitting, by the processor, the mail, generated by the generating, to the set address; and
controlling, by the processor, deletion of the content data stored in the memory.

* * * * *